(12) United States Patent
Field et al.

(10) Patent No.: US 9,325,756 B2
(45) Date of Patent: Apr. 26, 2016

(54) TRANSMISSION OF CONTENT FRAGMENTS

(75) Inventors: Brian Field, Evergreen, CO (US); Jan Van Doorn, Castle Rock, CO (US); Jim Hall, Centennial, CO (US); Daniel Groustra, Littleton, CO (US); Mark Torluemke, Centennial, CO (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 94 days.

(21) Appl. No.: 13/339,769

(22) Filed: Dec. 29, 2011

(65) Prior Publication Data

US 2013/0173817 A1    Jul. 4, 2013

(51) Int. Cl.
| | | |
|---|---|---|
| *G06F 15/16* | (2006.01) | |
| *H04L 29/06* | (2006.01) | |
| *H04N 21/433* | (2011.01) | |
| *H04N 21/63* | (2011.01) | |
| *H04N 21/6375* | (2011.01) | |
| *H04N 21/845* | (2011.01) | |
| *H04N 21/854* | (2011.01) | |

(52) U.S. Cl.
CPC ........ *H04L 65/4084* (2013.01); *H04L 65/4076* (2013.01); *H04N 21/4331* (2013.01); *H04N 21/632* (2013.01); *H04N 21/6375* (2013.01); *H04N 21/8456* (2013.01); *H04N 21/85406* (2013.01)

(58) Field of Classification Search
CPC ........... H04L 65/4076; H04L 65/4084; H04N 21/4331; H04N 21/85406; H04N 21/6375; H04N 21/8456; H04N 21/632
See application file for complete search history.

(56) References Cited

U.S. PATENT DOCUMENTS

| | | | |
|---|---|---|---|
| 5,113,392 A | 5/1992 | Takiyasu et al. | |
| 5,440,545 A | 8/1995 | Buchholz et al. | |
| 5,821,519 A | 10/1998 | Lee et al. | |
| 6,351,467 B1* | 2/2002 | Dillon | 370/432 |
| 7,359,983 B1* | 4/2008 | Maufer et al. | 709/236 |
| 7,539,750 B1 | 5/2009 | Parker et al. | |
| 7,870,278 B2 | 1/2011 | Corl, Jr. et al. | |
| 8,150,993 B2* | 4/2012 | Glasser et al. | 709/231 |
| 8,244,879 B2 | 8/2012 | Pagan | |
| 8,347,343 B2 | 1/2013 | Suh et al. | |
| 8,661,295 B1* | 2/2014 | Khanna et al. | 714/43 |
| 2003/0031176 A1* | 2/2003 | Sim | 370/392 |
| 2003/0162495 A1 | 8/2003 | Yonemoto et al. | |
| 2003/0187917 A1* | 10/2003 | Cohen | 709/203 |
| 2003/0188009 A1 | 10/2003 | Agarwalla et al. | |
| 2004/0052371 A1 | 3/2004 | Watanabe | |
| 2004/0098408 A1 | 5/2004 | Gensel | |
| 2006/0029102 A1 | 2/2006 | Abe et al. | |
| 2006/0031411 A1 | 2/2006 | Gimson et al. | |
| 2007/0027974 A1* | 2/2007 | Lee et al. | 709/223 |
| 2008/0170531 A1 | 7/2008 | Petry et al. | |
| 2009/0158096 A1* | 6/2009 | Ali et al. | 714/43 |
| 2009/0216537 A1 | 8/2009 | Nishiyama et al. | |
| 2010/0180171 A1 | 7/2010 | Liu et al. | |

(Continued)

*Primary Examiner* — Brendan Higa
*Assistant Examiner* — Padma Mundur
(74) *Attorney, Agent, or Firm* — Banner & Witcoff, Ltd.

(57) ABSTRACT

Some aspects of the disclosure relate to transmitting content over a network. For example, a device may determine that it is missing a content fragment from its cache, and may send a request for the content fragment. A network device may be configured to respond to such requests by transmitting the content fragment. In some instances, this may allow receiving devices to acquire the missing content fragment without the need to transmit a request for content.

20 Claims, 11 Drawing Sheets

(56) References Cited

U.S. PATENT DOCUMENTS

| | | |
|---|---|---|
| 2010/0260191 A1 | 10/2010 | Hiie et al. |
| 2010/0296584 A1* | 11/2010 | Base et al. ............... 375/240.25 |
| 2011/0261822 A1 | 10/2011 | Battestilli et al. |
| 2011/0302320 A1* | 12/2011 | Dunstan et al. ............... 709/235 |

* cited by examiner

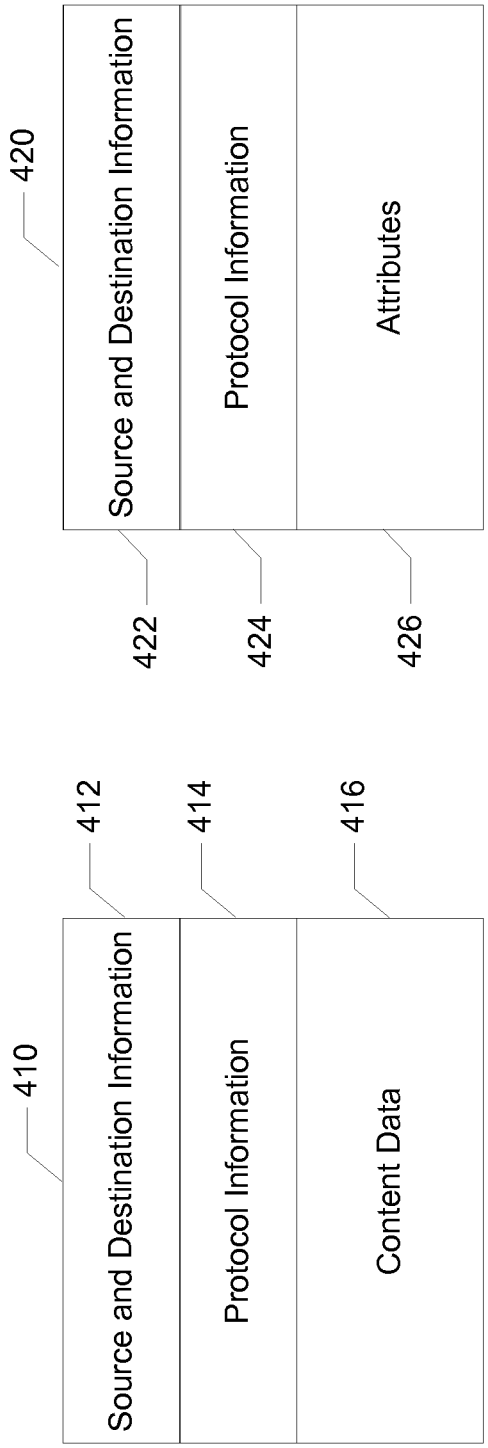

TRANSMISSION OF CONTENT FRAGMENTS

BACKGROUND

Devices, such as network gateways, set top boxes, and web-enabled devices, may be deployed in numerous premises in communication with information distribution networks that serve the premises, such as households and/or businesses, over a wide region. Content providers may distribute content, services, and other information to the premises via the information distribution networks. How efficiently a content provider is able to deliver the content, services, and other information to the devices throughout a network depends on various factors. For example, the capacity (e.g., bandwidth) of the network, the number of the devices being served by the content provider, and the schemes and/or protocols used throughout the network can affect the network's performance. This disclosure identifies and addresses issues related to a network that could perform more efficiently and handle more data if an increased amount of bandwidth can be used for delivering content, or if the available bandwidth could be used more effectively to deliver content to devices of the network.

SUMMARY

Some aspects of the disclosure relate to methods and systems for delivering content to devices of a distribution network. In one or more arrangements, a multicast transmission may deliver content to a plurality of devices. For example, a content server may be transmitting content to receiving devices (e.g., via a multicast transmission, unicast transmission, broadcast transmission, switched digital video (SDV), etc.). The content server may receive a request that identifies a content fragment that is one of the fragments that was transmitted to the receiving devices. This request may be sent from one of the receiving devices (or another computing device, such as another content server). As a response to the request, the content server may transmit the content fragment using a plurality of packets. The plurality of packets may conform to a protocol configured to enable reassembly of the content fragment at the receiving devices. In some embodiments, the protocol may also be configured to enable storage of the content fragment based on at least one of the one or more attributes.

In some embodiments, prior to sending the request, a receiving device may have determined that one of the content fragments was missing from its cache. When the missing content fragment is discovered, the receiving device may transmit the request for the missing content fragment to the content server. Upon receiving the content fragment (e.g., via a multicast or unicast transmission), the receiving device may reassemble the content fragment and store the content fragment into its cache.

In one or more arrangements, the plurality of packets may include different types of packets, such as one or more content packets and one or more attribute packets. Additionally, in some embodiments, the protocol may be the discrete web object multicast protocol (DWOMP).

In another aspect, a content server, or other computing device, may determine a location and/or a device in a network based upon one or more requests for a content fragment. For example, a content server may extract information from one or more received requests, and compare and/or correlate the extracted information with network topology information. Based on the comparison and/or correlation, the content server may be able to identify a location and/or a device in the network. In some arrangements, this location or device may represent a location/device that is causing an event in the network, such as, for example, packet loss or data corruption.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIG. 4B illustrates an example content packet.

FIG. 4C illustrates an example attribute packet.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
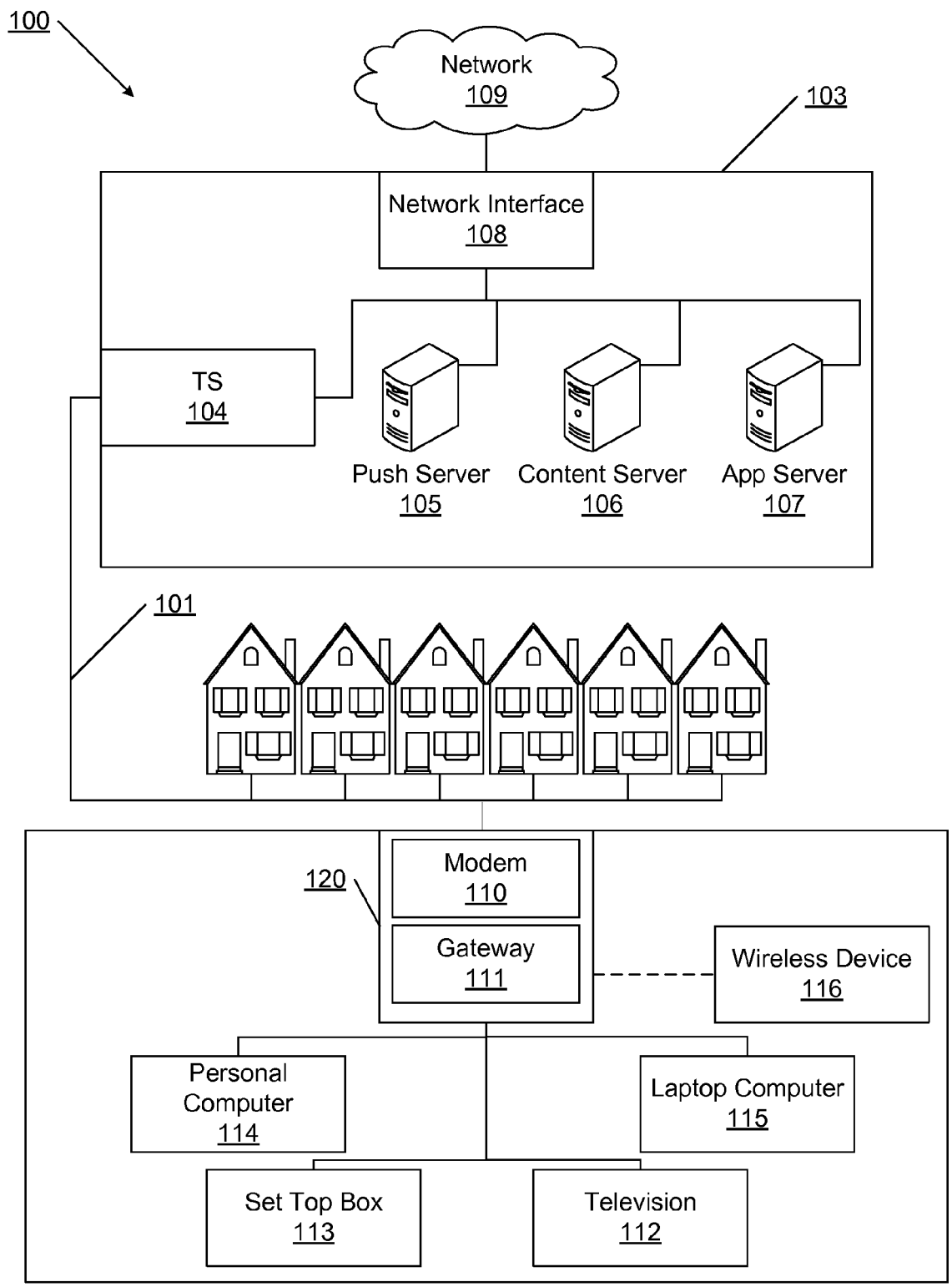
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Such networks 100 may use a series of interconnected communication lines 101 (e.g., coaxial cables, optical fibers, wireless, etc.) to connect an end-point to a central office or headend 103. Example end-points are illustrated in FIG. 1 as premises 102 (e.g., businesses, homes, consumer dwellings, etc.) The central office 103 may transmit information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in a HFC network, which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content and/or data server 106. The content/data server 106 may be one or more computing devices that are configured to provide content to users at their premises. This content may be, for example, video on demand movies, television programs, songs, text listings, etc., and/or data such as contact information, address books, and other user information. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102.

An example premises 102a may include an interface 120. The interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The modem 110 may be connected to, or be a part of, a gateway interface device 111. The gateway interface device 111 may be a computing device that communicates with the modem 110 to allow one or more other devices in the premises to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the premises, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
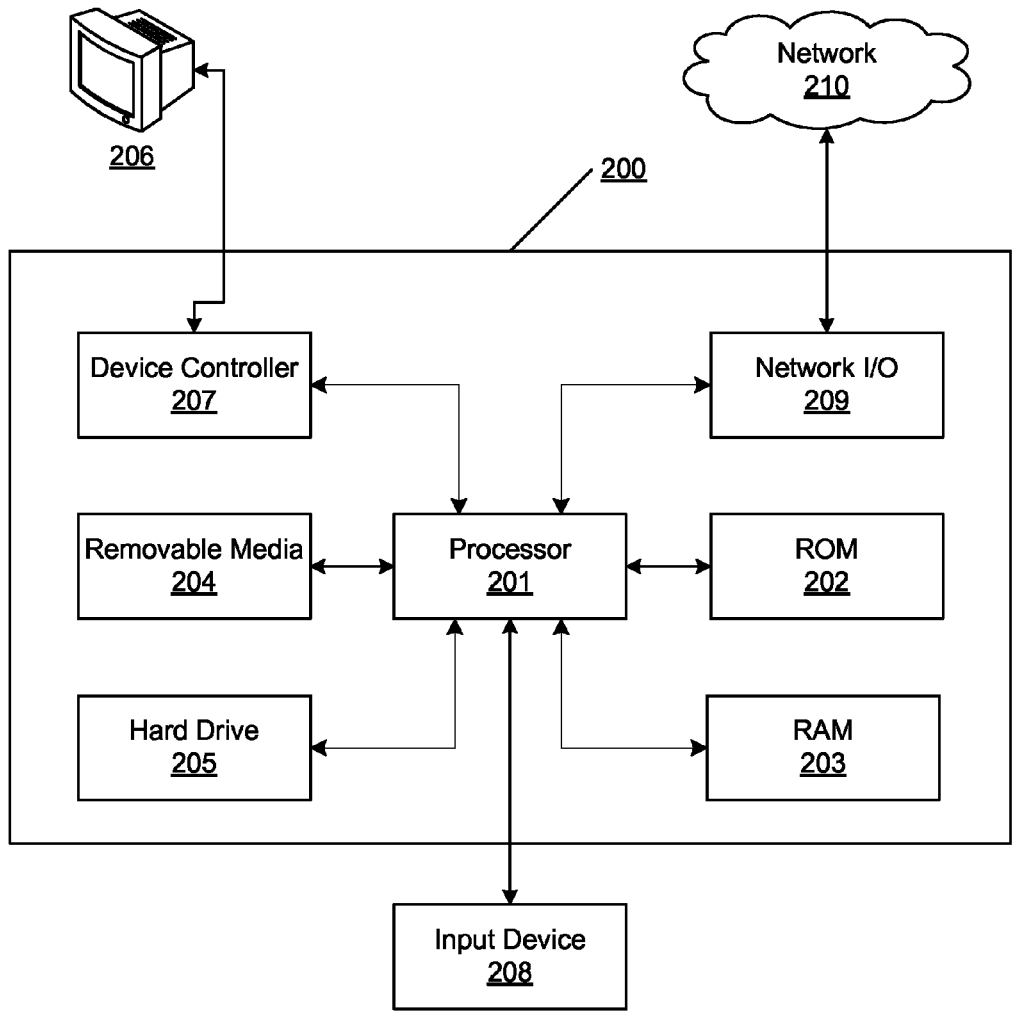
FIG. 2 illustrates an example computing device on which various elements described herein can be implemented.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of the networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor, such as 201; storage, such as 202; user interface;

etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of a network may transmit information downstream to various devices, such as receiving devices (e.g., a gateway interface device 111 of FIG. 1, web proxy, web server, etc.), or other user equipment (e.g., televisions 112, STBs 113, personal computers 114, laptop computers 115, wireless devices 116 of FIG. 1). The transmitted information may include content for consumption by a user (e.g., playback, viewing, listening, display, storage, etc.). To assist in distributing content to the various devices of the distribution network, a content provider may implement a system, scheme and/or protocol that multicasts content to the devices. In one or more arrangements, a multicast may be receivable by a plurality of devices. For example, devices in a plurality of premises (e.g., premises 102 of FIG. 1) at or near a first geographic location may be able to receive a multicast. Additionally, in some embodiments, other devices in a plurality of other premises, which are at or near a different geographic location, may not be able to receive a multicast. Devices that can receive the multicast can extract content and/or other information from the multicast transmission to receive content. The received content can then be subsequently displayed for consumption by a user. These aspects of the disclosure and others will be described in detail below. While many examples herein are described in terms of multicasting transmission techniques, other suitable techniques can be used.

Figure 3:
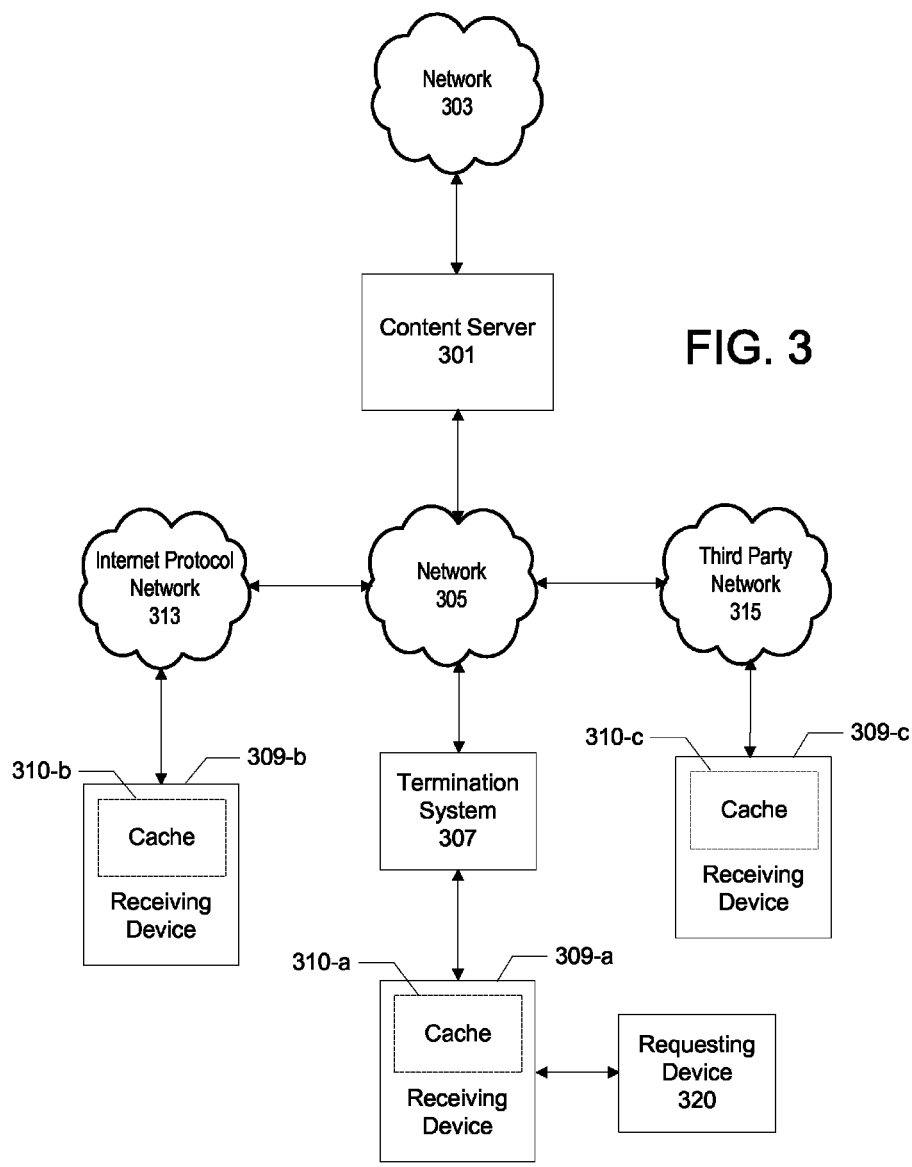
FIG. 3 illustrates an example system for transmitting content to devices over an information distribution or access network according to one or more aspects of the disclosure.

FIG. 3 illustrates an example system for transmitting content to devices over an information distribution or access network. The following example will be described in terms of multicasting transmission techniques. As illustrated in FIG. 3, a system for transmitting content may include a computing device, such as content server 301 (e.g., content/data server 106 of FIG. 1), and a network 303. The network 303 may include various network components and/or devices, such as servers, routers, communication lines, etc. For example, network 303 may include one or more content sources and/or service sources of the content provider (e.g., television program source, video-on-demand source, pay-per-view source, an interactive service source, data source, etc.). These sources (not shown) may transmit or make accessible content (e.g., video, audio, data objects, or other types of content items) to the content server 301 for distribution to other devices, such as receiving devices 309-a, 309-b, and 309-c. Receiving devices may be, for example, any user device such as a computer, smart phone, gateway, set top box, display device, etc. In one or more arrangements, the content sources may be sending content to the content server 301 via one or more linear feeds (e.g., an MPEG-2 linear feed, such as MPEG2-TS information encapsulated in one or more datagrams conforming to the uniform datagram protocol (UDP)).

In some embodiments, content server 301 may be configured to receive one or more linear feeds from one or more content sources, extract content (e.g., data) from the linear feeds, convert the data, if needed, and transmit the content to one or more receiving devices (e.g., via a multicast feed). For example, to convert data into a multicast, content server 301 may receive a plurality of content fragments (e.g., a portion of a larger content item, such as a video file). Content server 301 may then process and/or divide the plurality of content fragments into one or more packets conforming to a protocol for a multicast transmission. In one arrangement, content server 301 may be configured to convert content data into a multicast transmission conforming to the discrete web object multicast protocol (DWOMP), or other suitable protocols. Details of these, and others, will be discussed below.

In one or more arrangements, content server 301 may distribute content to receiving devices that are connected to the content server 301 via a plurality of different networks. In some arrangements, content server 301 may be configured to transmit data to receiving devices using both unicasts and multicasts. As illustrated in FIG. 3, receiving device 309-a is connected to the content server via a termination system 307 (e.g., TS 104 of FIG. 1) and network 305 of the content provider. Receiving device 309-b is connected to content server 301 via network 305 of the content provider and an Internet Protocol (IP) network 313 (e.g., the Internet). Receiving device 309-c is connected to content server 301 via network 305 of the content provider and a third party network 315 (e.g., a distribution network of another content provider, or a local network). Network 305 of the content provider may include one or more devices for interfacing with IP network 313 and/or third-party distribution network 315, such as a web proxy and/or web server (e.g., a web server at the edge of network 305 that interfaces with a device on IP network 313 and manages communications to and from IP network 313), and the like. Network 305 may itself be an IP network and other arrangements for connecting with devices 309 may be implemented.

In one or more arrangements, a receiving device (e.g., receiving device 309-a, 309-b and 309-c) may be configured to receive content (e.g., receive a multicast feed), decode and/or process the content, store the content in a cache, and provide the content for consumption (e.g., for display via another device). In some embodiments, the receiving devices may include one or more caches for storing data, such as the data received via a multicast. As illustrated in FIG. 3, receiving device 309-a includes cache 310-a, receiving device 309-b includes cache 310-b, and receiving device 309-c includes cache 310-c.

Some or all receiving devices (e.g., receiving device 309-a, 309-b and 309-c) may be able to communicate with one or more requesting devices, or other user device (e.g., devices 112, 113, 114, 115 and 116 of FIG. 1). A requesting device may be configured to transmit requests for content to a receiving device, such as when particular content is required for viewing or other consumption. For example, as illustrated in FIG. 3, requesting device 320, which may be a stand-alone device or be part of any device, may transmit an HTTP get request identifying particular content (e.g., a content fragment) to the receiving device 309-a. Receiving device 309-a may determine whether the particular content is in cache 310-a. If the content is found within cache 310-a, it may be retrieved from cache 310-a and transmitted to requesting device 320. Upon receiving the requested content, requesting device 320 may display the content, store the content for later viewing, etc. Requesting device 320 may take various forms, such as set-top box, a laptop or personal computer, a television set, etc. Also, the receiving and requesting devices may comprise one device.

A transmission, such as a multicast transmission, may conform to a particular protocol. Some protocols suitable for multicasting may be configured to cause content data to be stored at a plurality of receiving devices based on at least one attribute of the content data. One protocol suitable for multicasting content is the discrete web object multicast protocol (DWOMP). While the following discussion may refer to DWOMP in connection with example embodiments, it is to be understood that other protocols for communicating web objects are applicable. With reference specifically to DWOMP, the discrete web object multicast protocol is suitable for multicasting data objects, such as content fragments. Transmissions conforming to DWOMP may encapsulate data objects into one or more packets. DWOMP can encapsulate various types of object data, such as content items (e.g., a video file), service data objects (e.g., electronic service guide data), and the like. For example, in some arrangements, electronic program guide (EPG) data could be multicast using content packets that include the electronic program guide data and/or attribute packets that include attributes of the EPG multicast transmission. Indeed, any type of object data could be multicast according to the disclosure (e.g., content data, service data, object data, Internet data, web data, software update data, advertisement data, etc.).

In one or more arrangements, DWOMP may be configured to enable devices receiving a multicast transmission conforming to DWOMP to reassemble the data objects (e.g., a content fragment) at the receiving devices. For example, a transmission conforming to DWOMP may include content packets and attribute packets. The contents of the attribute packets and/or content packets enable receiving devices to reassemble a content fragment that is divided between the content packets. Additionally, in some arrangements, DWOMP may be configured to enable devices receiving a multicast transmission conforming to DWOMP to store the data objects (e.g., a content fragment) at the receiving devices based on one or more attributes included in the multicast transmission. Further, DWOMP allows for each data object to be self-describing in that the content and attribute packets for a particular data object may provide the name for the reassembled data object so a receiving device can store and/or retrieve the reassembled data object when needed. Details of these features, and others, will be discussed in detail below.

Figure 4A:
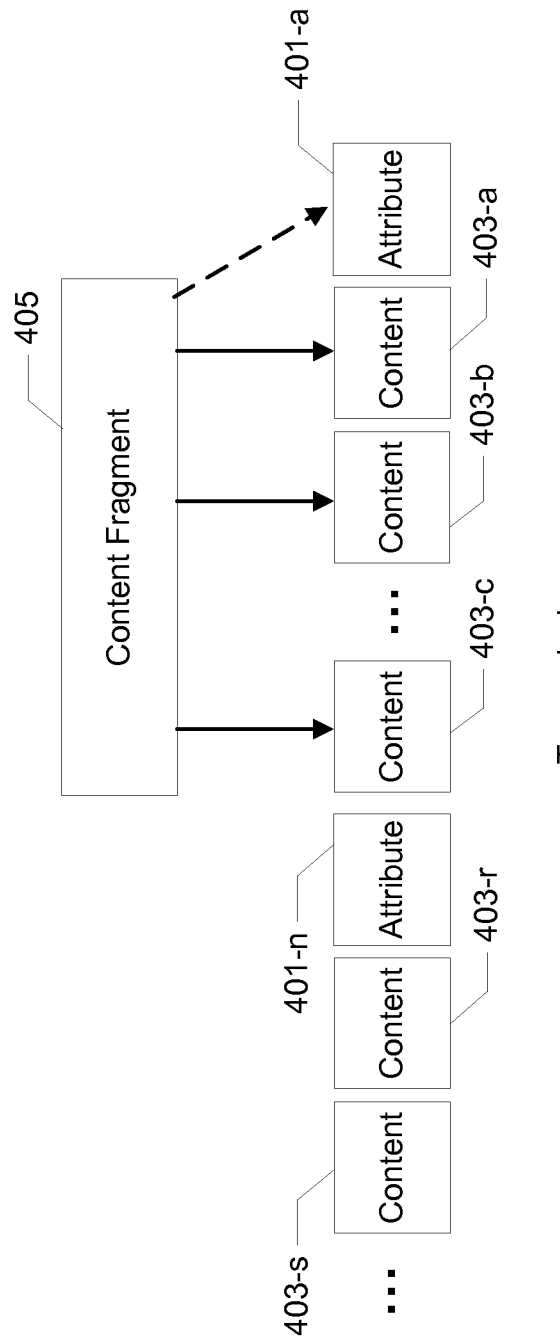
FIG. 4A illustrates a diagram representing an example transmission according to one or more aspects of the disclosure.

FIG. 4A illustrates a diagram representing an example transmission, such as a multicast transmission. As illustrated in FIG. 4A, an attribute packet for the transmission is followed by one or more content packets (e.g., attribute packet 401-a is followed by content packet 403-a, 403-b, 403-c, etc., attribute packet 401-n is followed by content packet 403-r, 403-s, etc.). In some arrangements, the example transmission may conform to DWOMP.

For example, the transmission of FIG. 4A may be for a particular content item (e.g., video file, video for a linear feed) and the content item may be divided into fragments. In some arrangements, each content fragment may include enough content data to reproduce a portion (e.g., seconds or longer) of the entire content item (e.g., video file, video for a linear feed). Additionally, each content fragment may include header information that allows a device to store, decode and/or demultiplex the content data of the fragment for consumption (e.g., view the two seconds of video included in the fragment on a display device).

The size of a content fragment may vary. For example, some fragments may be on the order of kilobytes, while others may be a megabyte or more. The header information of a content fragment may include a fragment identifier, which uniquely identifies the content fragment. In one example, content fragment 405 may include 101355 bytes of content data and have a fragment identifier of "/service/lr-ae/fragment-43" where "fragment-43" identifies the $43^{rd}$ content fragment.

Content fragment 405 may be de-assembled and inserted into one or more content packets. For example, because a content fragment may be on the order of kilobytes or larger, the content fragment may be portioned (or otherwise de-assembled) and the portions inserted into different content packets. As illustrated in FIG. 4A, content fragment 405 may be portioned between a first plurality of content packets that includes content packets 403-a, 403-b, and 403-c. The number of content packets in a plurality of content packets may be determined, for example, based on the size of the content fragment. In some arrangements, a content packet may be 1500 bytes long, with a maximum payload of 1450 bytes. Using this size of a content packet as an example, content fragment 405, which may include 101355 bytes of content data, may be portioned over 70 content packets. Additional details on the data of a content packet will be discussed below.

Each plurality of content packets may be associated with one or more attribute packets. As illustrated in FIG. 4A, the first plurality of content packets that includes content packets 403-a, 403-b and 403-c is associated with attribute packet 401-a. Attribute packet 401-a includes information related to the first plurality of content packets (e.g., content packet 403-a, 403-b, 403-c, etc.) and/or content fragment 405. In some arrangements, an attribute packet may include information extracted from the content fragment (as illustrated by the dashed line of FIG. 4A), a header associated with the content, and/or metadata associated with the content. Additional details on the data of an attribute packet will be discussed below.

Other content fragments may be processed and/or divided into other content packets. For example, as illustrated in FIG. 4A, a different content fragment (e.g., content fragment "/service/lr-ae/fragment-42", etc.) may be divided between a second plurality of content packets that includes content packets 403-r and 403-s. The second plurality of content packets is associated with attribute packet 401-n, which may include attributes related to the second plurality of content packets and/or the different content fragment.

In some embodiments, because each content fragment has its own set of content and attribute packets, each content fragment in a transmission may be independent from other fragments in the transmission (e.g., each content fragment is self-describing). In other words, each fragment can be separately reassembled and stored by a receiving device based on its own attributes. Indeed, the reassembly and storage of the content fragment at a receiving device may not be dependent on any of the other content fragments included in the multicast transmission. As illustrated in FIG. 4A, content fragment 405 could be reassembled and stored at a receiving device after attribute packet 401-a and all its content packets (e.g., packets 403-a, 403-b, 403-c, etc.) have been received.

FIG. 4B illustrates an example content packet. As illustrated in FIG. 4B, content packet 410 includes source and destination information 412, protocol (e.g., DWOMP) information 414 and content data 416.

In some arrangements, source and destination information 412 may include data fields related to various web-based protocols, such as source and destination addresses and/or ports. In one example, source and destination information 412 may include IP destination address information (e.g., 232.x.y.z), IP source address information (e.g., 69.240.a.b), and UDP destination port information (e.g., 9000).

In one or more illustrative embodiments, protocol information 414 may include data fields related to the multicast transmission, such as a packet number, a payload size, and bytes remaining data fields. In some arrangements, protocol information 414 may include a packet number that is relative to particular content packets (e.g., the first plurality of content packets of FIG. 4A that includes content packets 403-a, 403-b, and 403-c). For example, a first content packet for a content fragment (e.g., content packet 403-a of FIG. 4A) may have a packet number of x, while the last content packet for the content fragment (e.g., content packet 403-c of FIG. 4A) may have a packet number of x+n, where n is the number of content packets. Various other packet numbering schemes are possible. For example, the packets may be numbered relative to particular content packets and an associated attribute packet (e.g., if the attribute packet for a content fragment has a packet number of x, the first content packet for the content fragment can be x+1, and the last content packet can be x+1+n, where n is the total number of content packets, etc.) As another example, the packet numbering scheme may be an incremental scheme that is applied to all packets in the multicast transmission (e.g., attribute packet 401-a of FIG. 4A is packet 0, content packet 403-a is packet number 1, content packet 403-c is the 100th packet in the multicast transmission and has a packet number of 99, attribute packet 401-n is packet number 100, etc.)

The value of the payload size may represent the length in bytes of the content data 416 portion of the content packet. In some illustrative embodiments, a content packet has a maximum amount of content data that can be held (e.g., 1450 bytes, etc.). In some instances, all but one content packet for a content fragment would contain the maximum amount of content data. For example, the first content packet for a content fragment may have a payload size equal to the maximum amount (e.g., content packet 403-a of FIG. 4A may have a payload size of 1450 bytes), while the last content packet for the content fragment may have a payload size equal to the remainder of the content fragment (e.g., content packet 403-c of FIG. 4A may have a payload size of 1305 bytes).

The value of the bytes remaining data field may represent the number of bytes remaining in the content fragment. This value may be calculated based on the end of the content fragment. For example, the first content packet for a content fragment (e.g., content packet 403-a of FIG. 4A) can have Y−m (e.g., 99815) bytes remaining, where Y is the total number of bytes in the content fragment (e.g., 101355) and m is the payload size of the first content packet (e.g., 1450 bytes). The second content packet can have Y−m−k (e.g., 98365) bytes remaining, where k is the payload size of the second content packet (e.g., 1450 bytes). Extending this formula throughout the remaining content packets, the last content packet (e.g., content packet 403-c of FIG. 4A) can have zero bytes remaining.

FIG. 4C illustrates an example attribute packet. As illustrated in FIG. 4C, attribute packet 420 includes source and destination information 422, protocol (e.g., DWOMP) information 424 and attributes 426. In some arrangements, source and destination information 422 may include data fields similar to the source and destination information of a content packet (e.g., source and destination information 412 of FIG. 4B), such as source and destination addresses (e.g., IP source address, IP destination address, etc.) and/or ports (e.g., UDP destination port). However, in one or more arrangements, the values of an attribute packet's source and destination information may be different when compared to the source and destination information for the content packet. For example, content packets and attribute packets may be directed to different destination ports (e.g., content packets 403-a, 403-b, and 403-c of FIG. 4A may be directed to a UDP destination port of 9000, while attribute packet 401-a may be directed to a UDP destination port of 9050).

In one or more illustrative embodiments, protocol information 424 may include data fields similar to the DWOMP information of a content packet (e.g., DWOMP information 414 of FIG. 4B), such as a packet number, a payload size and a bytes remaining data field. Additionally, in some embodiments, the payload size of attribute packet 420 may depend on the size of the attribute packet's attributes portion 426. In some arrangements, the bytes remaining data field included in DWOMP information for attributes packets may have a zero value.

An attribute packet's attributes portion 426 may include one or more data fields that identify attributes and/or characteristics of content packets and/or a content fragment. For example, referring to FIG. 4A, attribute packet 401-a may include an attributes portion that includes one or more data fields identifying attributes and/or characteristics related to the first plurality of content packets, which includes content packets 403-a, 403-b and 403-c. The attributes portion of attribute packet 401-a may also include attributes and/or characteristics related to content fragment 405. Referring again to FIG. 4C, in some arrangements attributes 426 may include a fragment name identifier, a service identifier, a content destination port data field, a file size data field, caching information, and a checksum field.

In some embodiments, the fragment name identifier may be the same as a fragment identifier. For example, with respect to FIG. 4A, attribute packet 401-a may include a fragment name identifier that is the same as the fragment identifier of content fragment 405 (e.g., "/service/lr-ae/fragment-43").

In some arrangements, a service identifier may identify a service for the content data. In one or more arrangements, the service identifier may be similar to a portion of the fragment identifier. For example, with respect to FIG. 4A, attribute packet 401-a may include a service identifier that identifies a service for content fragment 405 (e.g., "lr-ae").

In some embodiments, a content destination port data field may identify the destination port of the content packets associated with the attribute packet. For example, with respect to FIG. 4A, attribute packet 401-a may include a content destination port data field that identifies the destination port of content packets 403-a, 403-b, 403-c, etc., (e.g., a destination port of 9000).

In one or more embodiments, a file size data field may indicate the size (e.g., in bytes) of the content fragment (e.g., the size of content fragment 405 of FIG. 4A) and/or the entire content item (e.g., content fragment 405 of FIG. 4A is one fragment of a content item, such as a fragment of a video file for a video-on-demand service) of the multicast transmission illustrated in FIG. 4A includes content fragment 405).

In one or more arrangements, caching information may include additional information used by a receiving device (e.g., receiving devices 309-a, 309-b, 309-c of FIG. 3) when caching and/or storing the content data received via the content packets.

In some embodiments, a checksum field can include a checksum for validating the reassembled content fragment at a receiving device. The value of the checksum field could be calculated based on the content fragment of the attribute packet. For example, with respect to content fragment 405 of FIG. 4A, attribute packet 401-*a* may include a checksum field whose value is calculated from content fragment 405. Alternatively, the checksum could be calculated based on the content data of the content packets associated with attribute packet 401-*a* (e.g., content packets 403-*a*, 403-*b*, 403-*c*, etc.). The checksum field can be used by a receiving device to validate a reassembled content fragment. The receiving device may, upon receiving the necessary packets and reassembling the content fragment, compute a checksum from the reassembled content fragment and compare the computed checksum to the checksum included in the attribute packet. If the two values match, the reassembled content fragment could be stored and/or made available for consumption (e.g., viewing). If the values are different, the reassembled content fragment could be discarded and/or an appropriate error condition could be flagged.

Figure 5:
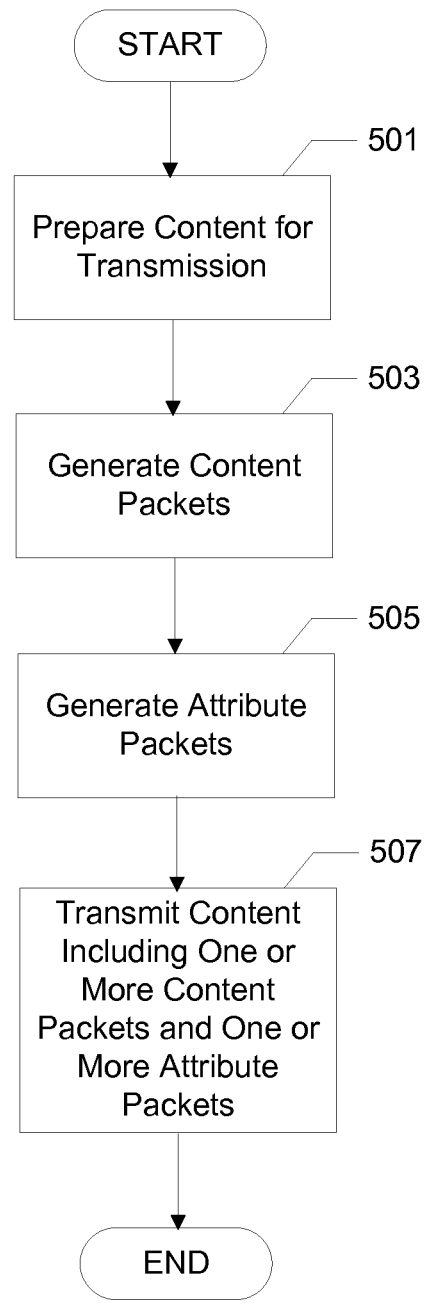
FIG. 5 illustrates an example method for transmitting content according to one or more aspects of the disclosure.

FIG. 5 illustrates an example method for transmitting content. In some arrangements, a content server (e.g., content server 301 of FIG. 3) may be configured to perform the example method of FIG. 5 so that content can be transmitted via a multicast transmission (e.g., a multicast transmission as illustrated by FIG. 4A).

Referring to FIG. 5, at step 501, content may be prepared for transmission. For example, the content server may receive content for multicasting to a group of devices. As discussed above, a content server may receive content from different content sources (e.g., television program source, video-on-demand source, pay-per-view source, an interactive service source, etc.). In one example, the content server may receive one or more content fragments (e.g., content fragment 405 of FIG. 4A), such as fragments of a video file for a video-on-demand service via a linear feed from a video-on-demand source. In another example, the content server may receive content fragments from a linear feed of a live television program (e.g., a live sporting event, such as a football game). Each received content fragment has a size (e.g., in bytes), and may include a unique fragment identifier (e.g., "/service/lrae/fragment-43", etc.). In some instances, the content server may receive content fragments for a particular content item (e.g., a video file for a video-on-demand service, etc.). In some embodiments, in order to receive the content fragments, the content server may determine which linear feed includes the content fragment(s), extract the content fragment(s) from the linear feed, and/or store the content fragment(s) in a local memory of the content server (e.g., store a Portable Network Graphics (PNG) or similar version of the content fragment in a cache of the content server).

At step 503, the content server may generate one or more content packets. In some arrangements, the content server may retrieve one or more content fragments from the local memory (e.g., content fragment 405 of FIG. 4A). For each retrieved content fragment, the content server may encapsulate a content fragment into content packets (e.g., encapsulate content fragment 405 of FIG. 4A into the first plurality of content packets, which includes content packets 403-*a*, 403-*b* and 403-*c*). For example, content packets may be generated for each content fragment that was received at step 501 (e.g., generate content packets 403-*a*, 403-*b*, 403-*c*, etc., of FIG. 4A for content fragment 405, etc.). In one or more arrangements, the content packets may conform to DWOMP (e.g., example content packet illustrated by FIG. 4B), and include DWOMP information and/or source and destination information.

At step 505, the content server may generate one or more attribute packets. In some arrangements, the content server may determine one or more attributes based on a content fragment and/or content packets. For example, an attribute packet may be generated for each content fragment that was received at step 501 (e.g., generate attribute packet 401-*a* of FIG. 4A for content fragment 405, etc.). In some instances, the determined attributes can include attributes such as a fragment name identifier, a service identifier, a content destination port data field, a file size data field, and caching information, etc. Once determined, the attributes may be encapsulated within one or more attribute packets (e.g., encapsulate attributes into attribute packet 401-*a* of FIG. 4A). In some arrangements, the attribute packets may conform to DWOMP (e.g., the example attribute packet illustrated by FIG. 4C), and include DWOMP information and/or source and destination information.

At step 507, the content server may proceed with transmitting the content. The transmission may include the content packets and attribute packets generated in steps 503 and 505. In some arrangements, the content server may first transmit one or more attribute packets (e.g., attribute packet 401-*a* of FIG. 4) and then transmit one or more content packets following the attribute packet(s) (e.g., transmit the first plurality of content packets of FIG. 4A, which includes content packets 403-*a*, 403-*b* and 403-*c*, after transmitting attribute packet 401-*a*). In others, the content server may first transmit one or more content packets (e.g., content packet 403-*a*, 403-*b* and 403-*c*, etc.) and then transmit one or more attribute packets following the content packet(s) (e.g., transmit attribute packet 401-*a* after content packet 403-*a*, 403-*b* and 403-*c*, etc.). Additionally and/or alternatively, the order in which the content packets and/or attribute packets for a content fragment are transmitted may be specified by DWOMP, or another protocol. The process of transmitting attribute packets and content packets may be repeated until each received content fragment has been transmitted via the transmission (e.g., a multicast transmission).

In some embodiments, the content server may transmit the content using resources that are dedicated to particular types of transmissions, such as resources dedicated to multicast transmissions. For example, the content server may transmit the content using a feed and/or group that is dedicated to multicast transmissions. In some arrangements, a feed or group can include data of other multicast transmissions (e.g., content server could transmit two content items via two multicast transmissions using a single multicast feed or group). In others, a feed or group can be dedicated to multicast transmissions for a particular service (e.g., video content for a particular channel, or pay-per-view event), a particular content item (e.g., a particular video program, such as a sporting event, etc.), a particular type of service (e.g., content for only video-on-demand services, content for only pay-per-view events, content for an electronic program guide, content for another interactive service, etc.), and/or a particular type of content item (e.g., a feed for video content, a feed for audio content, a feed for advertisements, etc.).

In some embodiments, the content server may perform and/or initiate a transmission in response to various conditions. In one or more arrangements, the content server may use a combination of the following examples.

For example, the content may be transmitted based on an event time, such as a date or time-of-day, etc. In some instances, the content may be transmitted before a broadcast, consumption and/or distribution time for the content (e.g., in order for the content data of the program to be placed in a cache of a receiving device before it is processed for consumption, such as viewing). In one example, a multicast for a television program may be initiated/performed before the scheduled broadcast time of the television program (e.g., a multicast for a television program that will be broadcast at 8:00 PM may be initiated/performed before 8:00 PM). A consumption time may be a time that is in relation to when the content is to be consumed by a receiving device, such as an indication of when a receiving device needs the content (e.g., a time when a receiving device is to begin recording/viewing the content, a time when a receiving device is scheduled to begin recording/viewing the content, etc.). For example, a transmission, such as a multicast, being initiated/performed prior to a consumption time may be transmitted such that the content is received by the receiving devices prior to the receiving device needing the content and/or content fragments (e.g., prior to the scheduled consumption time). A distribution time may be a time that is in relation to when the content is to be distributed from a provider or a computing device of a provider (e.g., a time of release for the content). For example, a transmission, such as a multicast, being initiated/performed prior to a distribution time may be transmitted such that the content is received by the receiving devices prior to a time that the content becomes available to users of the content provider's services (e.g., prior to a movie or television program becoming available in a video-on-demand service, etc.).

As another example, a transmission, such as a multicast, may be performed based on the receipt of content data at the content server (e.g., the content server is configured to multicast the content whenever the server receives content data from a content source).

In another example, a transmission, such as a multicast, may be performed based on type of content. As a few illustrative examples, content (e.g., a movie) for a video-on-demand may be multicast, while content for one or more television programs being currently broadcast (e.g., a sitcom on a broadcast television channel) may not; content for a pay-per-view event (e.g., a boxing match) may be multicast, while video-on-demand content may not; sports event content (e.g., a live football game, a rebroadcast of a basketball game, etc.) may be multicast, while other television programs may not; news-related content (e.g., a local news program) may be multicast, while other content may not, etc.

As yet another example, a transmission, such as a multicast, may be performed if the content is being consumed (e.g., viewed) by a threshold number of users (or is expected to be consumed/watched by a threshold number of users). As one example, only content for certain sporting events (e.g., a playoff game, championship game, etc.) may be multicast, while other sports events may not. Similarly, live sporting events (or premieres of television programs) could be multicast, while rebroadcasts may not.

Figure 6:
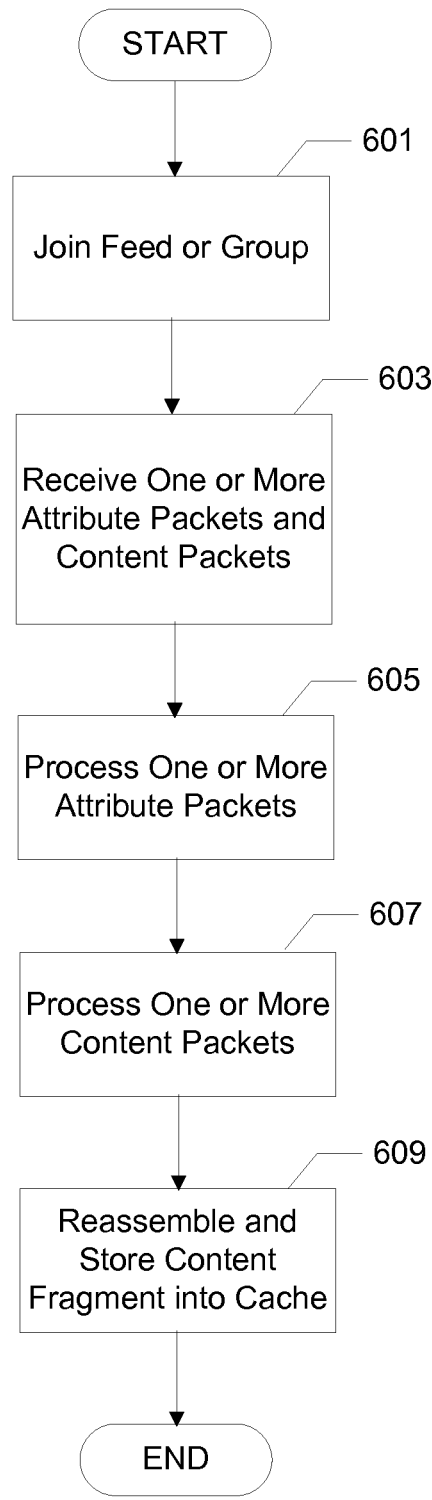
FIG. 6 illustrates an example method for receiving a transmission according to one or more aspects of the disclosure.

FIG. 6 illustrates an example method for receiving a transmission (e.g., at a receiving device, such as receiving device 309-a of FIG. 3). The following example will be described in terms of multicasting transmission techniques. In one or more arrangements, the manner in which a receiving device receives the multicast transmission may be specified by DWOMP, or another protocol.

At step 601, the receiving device may join a feed or group, such as a multicast feed or group. In some arrangements, joining a multicast feed or group may include communication between the receiving device, the network, and a server, such as content server 301 of FIG. 3. For example, the receiving device may transmit an Internet Group Management Protocol (IGMP) Join to its directly connected router in order to join a multicast feed associated with a specific content server. The receiving device may begin receiving data via the multicast feed or group until the receiving device opts to stop receiving the multicast content by issuing an IGMP Leave request. The receiving device might receive the multicast content for seconds, minutes, hours or days. In some variations, a receiving device may not be able to receive a multicast feed or group without first joining the feed or group.

At step 603, the receiving device may receive (e.g., via a multicast transmission) one or more attribute packets and one or more content packets (e.g., attribute packets 401-a, 401-n of FIG. 4A, content packets 403-a, 403-b, 403-c, 403-r, 403-s, etc.). The packets may be received over a particular multicast feed or group. In some arrangements, attribute packets may be received via a first port (e.g., at the port identified by the destination port of the attribute packet's source and destination information). Similarly, content packets may be received via a second port (e.g., at the port identified by the destination port of the source and destination information of the content packet).

At step 605, the receiving device may process one or more attribute packets. In some arrangements, the processing of the attribute packets conforms to the DWOMP specification (or other suitable protocol specification). For example, the receiving device may extract information from the DWOMP information and attributes portions of an attribute packet. In one or more arrangements, processing an attribute packet may include extracting the one or more attributes, such as the fragment name identifier, the content packets destination port, the file size, and any caching information, and storing the extracted attributes in a memory of the receiving device, (e.g., cache 310-a of receiving device 309-a of FIG. 3). The processing may also include extracting the packet number, payload size, and/or bytes remaining data fields from the attribute packet.

At step 607, the receiving device may process one or more content packets. In some arrangements, the processing of the content packets may conform to the DWOMP specification (or other suitable protocol specification). For example, the receiving device may extract information from the DWOMP information and content data portions of a content packet. In one or more arrangements, processing the content packets may include extracting content data (e.g., portions of a content fragment) from the payload of the content packets and storing the extracted content data into a memory. The processing may also include extracting the packet number, payload size, and/or bytes remaining data fields from the content packet.

Additionally, in some arrangements, step 607 may be performed before step 605. For example, the receiving device may process one or more content packets and then process one or more attribute packets.

At step 609, the receiving device may reassemble and store a content fragment into a cache or other memory (e.g., cache 310-a of receiving device 309-a of FIG. 3). For example, in some embodiments, content packets can contain portions of content data for a particular content fragment (e.g., content fragment 405 of FIG. 4A). Additionally, the content packets may be associated with one or more attribute packets (e.g., attribute packet 401-a of FIG. 4A is associated with the first plurality of content packets, which includes content packets 403-a, 403-b and 403-c). Using the information decoded from the content packets and any associated attribute packet, the receiving device may reassemble the content fragment (e.g., reassemble content fragment 405 using information extracted from attribute packet 401-a and the first plurality of content packets, which includes content packets 403-a, 403-b, and 403-c). In one example, the DWOMP information extracted from the content and attribute packets in steps 605 and 607 are used, in conjunction with the attributes extracted in step 607, to reassemble the content fragment.

Upon reassembling the content fragment, the receiving device may store the content fragment into a cache of the receiving device, or other memory. In some arrangements, the content fragment may be stored in the cache based on information of an attribute packet (e.g., content fragment 405 of FIG. 4A, upon being reassembled at a receiving device, may be stored based on information included in attribute packet 401-a). For example, the content fragment could be stored according to a fragment name identifier of the attribute packet (e.g., content fragment 405 of FIG. 4A is stored and given the name of "/service/lr-ae/fragment-43"). As another example, the content fragment could be stored according to the caching information of the attribute packet. As yet another example, the content fragment could be stored based on a combination of the fragment name identifier and the caching information. In some arrangements, how the content fragment is stored determines how the content fragment is accessed after it has been stored. For example, if the content fragment is stored according to the fragment name identifier, the fragment name identifier may be used to access the content fragment after it has been stored (e.g., content fragment 405 of FIG. 4A is accessed using an identifier of "/service/lr-ae/fragment-43").

Figure 7:
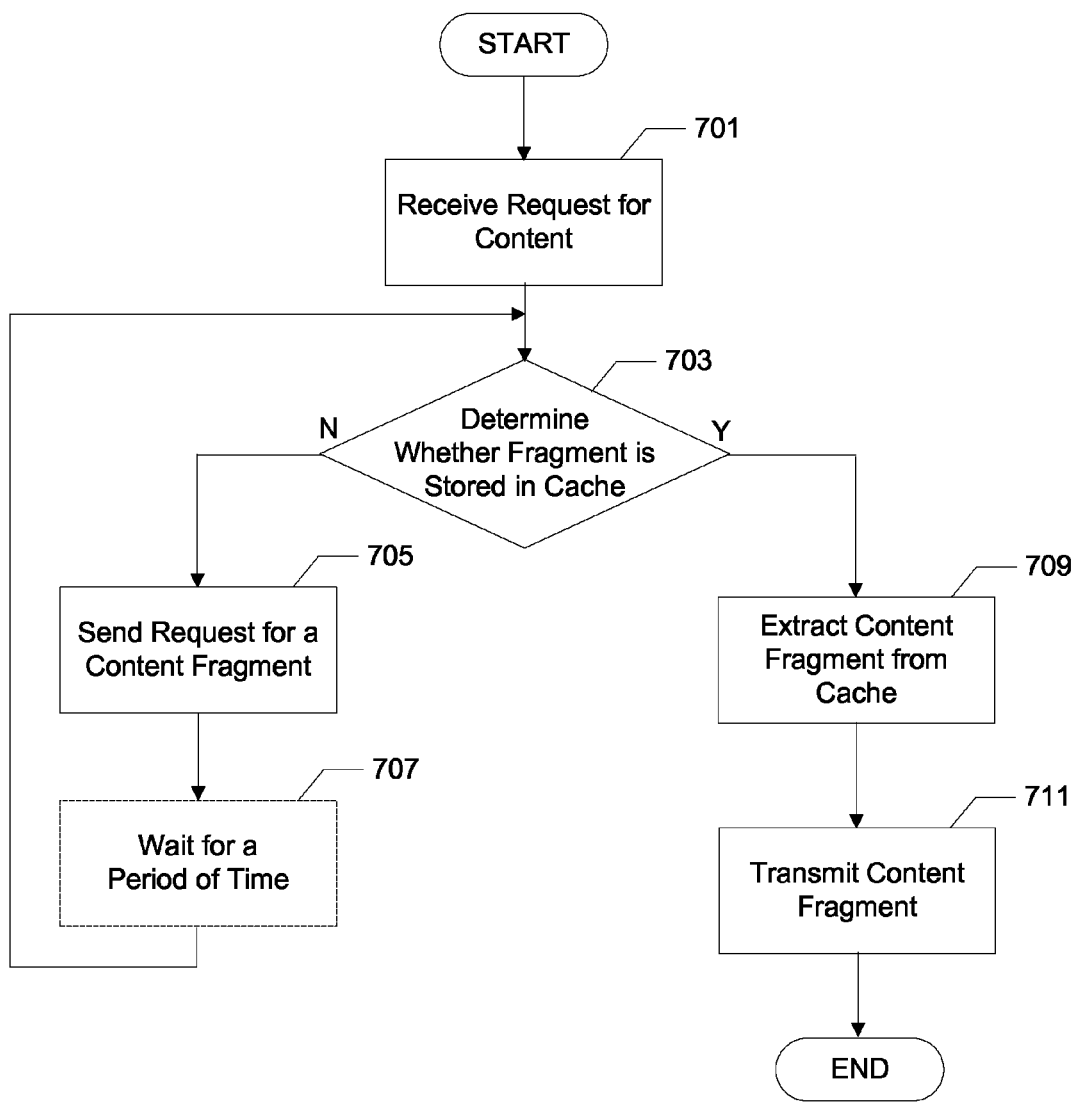
FIG. 7 illustrates an example method for processing a content fragment according to one or more aspects of the disclosure.
Figure 8:
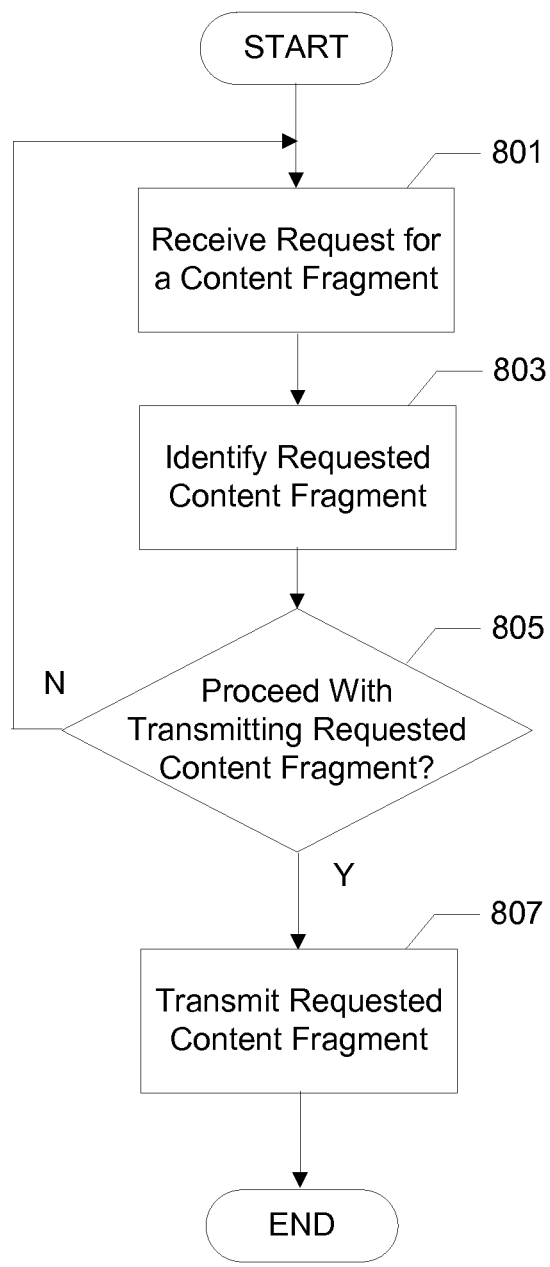
FIG. 8 illustrates an example method for responding to requests for a content fragment according to one or more aspects of the disclosure.

Various network events may impact the ability of a receiving device to reassemble the content fragment and insert the fragment into its cache. For example, occurrence of a network event can cause packet loss and/or data corruption. Packet loss and/or data corruption may prevent the receiving device from successfully reassembling and storing a content packet (e.g., loss of content packet 403-a of FIG. 4A may prevent content fragment 405 from being reassembled and stored). When attempts are made to retrieve a missing content fragment, consumption of the content item may be adversely affected (e.g., a user may experience problems viewing the video file that included the missing content fragment). FIGS. 7 and 8 illustrate example methods that can be used to retransmit one or more missing content fragments so that receiving devices can insert the missing content fragments into their caches. For example, FIG. 7 can be performed by a receiving device to identify missing content fragments, request transmission of the missing content fragments, and proceed to use the fragments once they have been inserted into the cache. FIG. 8 can be performed by a content server to transmit missing fragments in a transmission (e.g., a multicast transmission) that inserts the missing content fragments into the caches of one or more receiving devices.

In particular, FIG. 7 illustrates an example method for processing a content fragment. As discussed above, in one or more arrangements, the cache of a receiving device (e.g., a cache of a receiving device, such as cache 310-a of FIG. 3) may be used to store content fragments until the content is to be consumed by a user device (e.g., displayed on a television, computer, etc.). For example, another device (e.g., a set-top box, computer, other user device, etc., as illustrated by requesting device 320 of FIG. 3) may transmit requests (e.g., HTTP get requests) for content data when the device is ready to process the data for consumption (e.g., viewing). As each request is received, the receiving device may attempt to retrieve one or more content fragments from the cache and transmit content responsive to the request to the requesting device.

As illustrated in FIG. 7, at step 701, the receiving device receives a request for content (e.g., receives an HTTP get request from requesting device 320 of FIG. 3). In some arrangements, the request for content may be a request for one or more content fragments that should be transmitted. In others, the request for content may cause the receiving device to identify which content fragment(s) should be transmitted to the requesting device. For example, a user could be viewing the video content in a linear fashion on a display device (e.g., by viewing the first content fragment of the video content, then the second content fragment, then the third content fragment, etc.). At this particular time, the display device may be requesting the 43rd fragment of the video content. Using the information of the request for content and/or other information stored by the receiving device, the receiving device may determine that the "/service/lr-ae/fragment-43" fragment should be transmitted to the display device. In some embodiments, the receiving device may identify which content fragment is the next content fragment in the content item (e.g., if the first content fragment was previously transmitted, such as a content fragment including video and/or other content for 0:00 to 0:01 seconds of the content item, the receiving device may attempt to retrieve the second content fragment, such as a content fragment including 0:01 to 0:02 seconds of the content item). Additionally, in some arrangements, the receiving device may identify which content fragment corresponds to a particular time code of the content item (e.g., determine which content fragment includes video from 1 minute 0 seconds to 1 minute 1 seconds of the content item).

At step 703, the receiving device (e.g., receiving device 309-a of FIG. 3) may determine whether the content fragment that should be transmitted (e.g., the desired content fragment) is stored in the cache of the receiving device. In some embodiments, this determination could be performed by searching the cache for a stored fragment that matches the desired content fragment (e.g., the fragment is stored in the cache if a stored fragment and the desired content fragment have the same name, such as "/service/lr-ae/fragment-43", etc.). Some arrangements for determining whether the desired content fragment is stored in the cache may include searching the cache for stored fragments according to a fragment name identifier, various caching information, or some combination thereof. If the desired content fragment is stored in the cache, the method proceeds to step 709. Otherwise, the receiving device fails to find the desired content fragment in the cache and the method proceeds to step 705.

At step 705, the receiving device may send a request for a content fragment. In some arrangements, the request for a content fragment includes an identifier for a desired content fragment that is not currently stored in the cache (e.g., an HTTP get request identifying one or more content fragments). For example, if the desired content fragment is named "/service/lr-ae/fragment-43", and at step 703, it is determined that the cache does not contain a content fragment with a name matching "/service/lr-ae/fragment-43", the request for a content fragment may include the "/service/lr-ae/fragment-43" identifier. In some instances, the request for a content fragment may be sent to a content server. For example, the request for a content fragment may be sent to the content server that was the source of the transmission for the content item. In another example, the receiving device may send the request for a content fragment to a predefined Internet Protocol address and/or destination port. In some arrangements, once the request for a content fragment is sent, the method may proceed directly to step 703, where the determination of whether the desired content fragment (e.g., the fragment named "/service/lr-ae/fragment-43") is stored in the cache is performed again.

Optionally, instead of proceeding directly to step 703, the method may include step 707. At step 707, the receiving device may wait for a period of time after sending the request for a content fragment (e.g., wait for a tenth of a second, etc.). Once the period of time has expired, the method may proceed to step 703 to determine whether the desired content fragment (e.g., the fragment named "/service/lr-ae/fragment-43") has been received by the receiving device.

At step 709, the receiving device (e.g., receiving device 309-*a* of FIG. 3) may extract the desired content fragment (e.g., content fragment named "/service/lr-ae/fragment-43") from its cache. In one or more arrangements, the desired content fragment may be retrieved from the cache according to a fragment name identifier, various caching information, or some combination thereof. At step 711, the receiving device may transmit the requested content fragment to the source of the request for content that was received at step 701 (e.g., requesting device 320 of FIG. 3).

As discussed above with respect to step 705 of FIG. 7, a receiving device may send a request for a content fragment in response to determining that a desired content fragment is not stored in its cache. FIG. 8 illustrates an example method for responding to requests for a content fragment. In some embodiments, the method of FIG. 8 may be performed at a content server (e.g., content server 301 of FIG. 3). At step 801, a request for a content fragment may be received. For example, a request for a content fragment may be received at a content server (e.g., content server 301 of FIG. 3) from a receiving device (e.g., receiving device 309-*a*, 309-*b* or 309-*c*) via one or more networks (e.g., network 305 of FIG. 3). In some arrangements, a request for a content fragment may conform to HTTP (e.g., be the same or similar to an HTTP get request that identifies one or more content fragments). At step 803, a requested content fragment may be identified. For example, an identifier may be extracted from the request for a content fragment that was received at step 801. This identifier may be the name of a particular content fragment (e.g., "/service/lr-ae/fragment-43").

At step 805, a determination may be made whether to proceed with transmitting the requested content fragment (e.g., proceed with multicasting the requested content fragment). In some embodiments, determining whether to proceed with transmitting the requested content fragment could be based on receipt of a threshold number of requests for the requested content fragment. For example, a content server may increment a counter each time a request for a content fragment is received. When the counter is equal or greater than a threshold value (e.g., 1, 4, 10, 100, etc.), the content server may determine to proceed with transmitting the requested content fragment. While the counter is less than the threshold value (and/or equal to, depending on the embodiment), the content server may determine to not proceed with transmitting the requested content fragment. Additionally, upon determining to proceed with transmitting the requested content fragment, the counter may be reset to zero, or some other default value.

In some arrangements, the counter may be specific to a particular content fragment and the counter may be incremented when another request is received that identifies its fragment. In one instance, the content server may receive a request for a content fragment that identifies "/service/lr-ae/fragment-43" and the server may increment a counter specific to the "/service/lr-ae/fragment-43" fragment (e.g., increment the counter that tracks the number of requests for the "/service/lr-ae/fragment-43" content fragment). Any subsequent request for a content fragment that also identifies "/service/lr-ae/fragment-43" would similarly cause the content server to increment the counter. Once the threshold number of requests that identify the "/service/lr-ae/fragment-43" fragment have been received, it may be determined to proceed with transmitting the requested content fragment.

Additionally, the counter may be incremented when another request is received that identifies its fragment and is from a different source (e.g., received from a different receiving device). For example, a request may be received that identifies the "/service/lr-ae/fragment-43" fragment and is from receiving device 309-*b* of FIG. 3. As a response, the counter that tracks the number of requests for the "/service/lr-ae/fragment-43" fragment may be incremented. If another request for the "/service/lr-ae/fragment-43" fragment is received from receiving device 309-*b* of FIG. 3, the counter may not be incremented. However, if a request for the "/service/lr-ae/fragment-43" fragment is received from a different receiving device (e.g., receiving device 309-*a* of FIG. 3, receiving device 309-*c*, etc.), the counter may be incremented each instance a request is received from a different device (e.g., incremented when a request is received from receiving device 309-*a* of FIG. 3, incremented when a request is received from device 309-*c*, etc.).

The content server could also determine to proceed with transmitting the requested content fragment in various other ways. In some arrangements, the determination could be based on whether the content fragment was previously or is currently being transmitted (e.g., previously or currently being multicast). For example, the content server could determine whether the content fragment, or its content item, has been transmitted within a threshold time (e.g., 1 hour, 1 day, etc.). If the time of a transmission including the content fragment, or its content item, satisfies the threshold, the content server could determine to proceed with transmitting the requested content fragment. As another example, the content server could store a list of active transmission (e.g., a list including an entry directing the content server to multicast all content for video-on-demand services, a list including an entry for each content item that should be multicast by the content server, a list including an entry identifying which fragments can be multicast for a content item, etc.) and if the content fragment, its content item, its service, and/or the type of its content item or service is found on the list, the content server can determine to proceed with transmitting the requested content fragment.

Additionally, in some arrangements, the determination could be based on the receipt of requests for two or more content fragments of a particular service or content item. For example, the content server may receive a request that identifies the "/service/lr-ae/fragment-43" fragment and may also receive a request that identifies the "/service/lr-ae/fragment-49" fragment. Both of these fragments belong to the same service and/or content item, and upon receipt of each request, a counter could be incremented that tracks the number of requests that have been received for the service and/or content item. When the counter is greater than or equal to a threshold value, the content server may determine to proceed with transmitting the requested content fragment.

Further, in some embodiments, the determination could be based on the location of the fragments identified by the received requests with respect to the original content item. For example, a request may be received that identifies the "/service/lr-ae/fragment-43" fragment. The content server may determine to proceed with transmitting the requested content fragment if requests for one or more adjacent fragments have also been received (e.g., proceed with multicasting if a request for the "/service/lr-ae/fragment-42" fragment and/or the "/service/lr-ae/fragment-44" fragment has been received, etc.). Additionally, in some arrangements, one or more of the above described methods could also be combined when determining whether to proceed with transmitting the requested content fragment.

At step 807, the content server may proceed to transmit the requested content fragment, such as via a multicast transmission. In some arrangements, the content server may proceed similarly to the example method illustrated in FIG. 5, such as by generating content packets for the requested content fragment (e.g., step 504 of FIG. 5), generating attribute packets for the requested content fragment (e.g., step 505 of FIG. 5), and transmitting attribute and content packets for the requested content fragment (e.g., step 507 of FIG. 5). For example, if the "/service/lr-ae/fragment-43" fragment is the requested content fragment, the content server may retrieve the content fragment from memory, generate the attribute and content packets for the "/service/lr-ae/fragment-43" fragment, and then transmit attribute and content packets for the "/service/lr-ae/fragment-43" fragment. Alternatively, the content and attribute packets for the "/service/lr-ae/fragment-43" fragment could be stored in a memory. In such arrangements, the content server could retrieve the content and attribute packets from the memory and the attribute and content packets for the "/service/lr-ae/fragment-43" fragment.

In some arrangements, content server can transmit using the same group and/or feed that was used to previously transmit the content fragment. For example, if the "/service/lr-ae/fragment-43" fragment is video for a television program, the content server could transmit the "/service/lr-ae/fragment-43" fragment using the same feed and/or group that was used to transmit the television program (e.g., transmit the multicast using the feed and/or group dedicated for the television program, transmit the multicast using the feed and/or group dedicated for the channel broadcasting the television program, etc.). In others, the content server can transmit using a group and/or feed that is dedicated to retransmissions of content fragments.

Additionally, transmission performed at step 807 (e.g., a multicast transmission) may include data of other content fragments in addition to the requested content fragment. For example, in some arrangements, the transmission may include data for one or more content fragments that are adjacent to the requested content fragments (e.g., if "/service/lr-ae/fragment-44" is the requested content fragment, the "/service/lr-ae/fragment-43" fragment and/or the "/service/lr-ae/fragment-45" fragment may also be included with the "/service/lr-ae/fragment-44" fragment). As another example, the transmission may include data for other content fragments based upon other requests for content fragments that have been received by the content server (e.g., if a request for the "/service/lr-ae/fragment-44" fragment has been received and a request for the "/service/lr-ae/fragment-12" fragment has also been received, the transmission may include data for both content fragments). As yet another example, the transmission may include data for all content fragments of the content item (e.g., a complete retransmission of the content item).

As discussed above, a transmission, such as a multicast transmission, can be received by many receiving devices (e.g., received by receiving devices 309-*a*, 309-*b*, and 309-*c*, etc.). Upon receipt of the transmission, each receiving device can reassemble the "/service/lr-ae/fragment-43" fragment from the content and attributes packets of the transmission and store (e.g., insert) the reassembled fragment in its cache, in a manner that is similar to the example method of FIG. 6. In some instances, some of the receiving devices that received the transmission with the "/service/lr-ae/fragment-43" fragment, may not have sent a request for this fragment (e.g., receiving device 309-*c* has not yet determined that the "/service/lr-ae/fragment-43" fragment is missing from its cache). Thus, by reassembling and storing the "/service/lr-ae/fragment-43" fragment, a receiving device could be proactively filling a hole in its cache. For example, receiving device 309-*b* and 309-*c* of FIG. 3 may both be missing the "/service/lr-ae/fragment-43" fragment from their respective cache. Before receiving device 309-*c* attempts to find the "/service/lr-ae/fragment-43" fragment in its cache, receiving device 309-*b* may send a request for the "/service/lr-ae/fragment-43" fragment to content server 301. Upon receiving the request for the "/service/lr-ae/fragment-43" fragment, content server 301 may transmit the "/service/lr-ae/fragment-43" fragment, such as by multicasting. Receiving device 309-*c* may receive the transmission, reassemble the "/service/lr-ae/fragment-43" fragment and store the reassembled fragment in its cache. Thus, receiving device 309-*c* can find the "/service/lr-ae/fragment-43" fragment in its cache without sending a request for the "/service/lr-ae/fragment-43" fragment.

Figure 9:
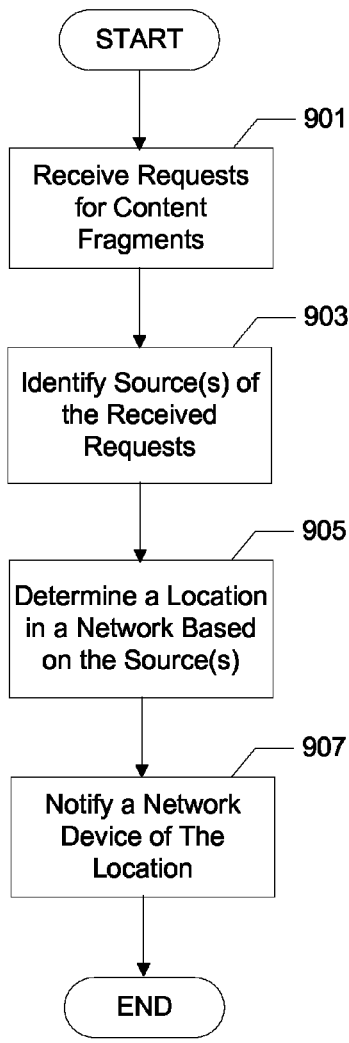
FIG. 9 illustrates an example method for determining a location or device in a network according to one or more aspects of the disclosure.

In addition to allowing a content server to transmit content fragments that are missing from the caches of receiving devices, the requests for content fragments can be used to locate where a network event occurred in the network. FIG. 9 illustrates an example method for determining a location or device in a network.

At step 901, a content server may receive one or more requests for content fragments. As discussed above, network events can cause packet loss and/or data corruption. Packet loss and/or data corruption may prevent the receiving device from successfully reassembling and/or storing a content fragment. When a receiving device determines that it is missing a content fragment, it may transmit a request for that missing content fragment (e.g., using an HTTP get request) to the content server. Other receiving devices may also transmit similar requests for a missing content fragment to the content server. In some instances, the requests may identify the same content fragment (e.g., each request is for the "/service/lr-ae/fragment-43" fragment). Additionally, the requests may identify other, and/or different, content fragments (e.g., one request identifies the "/service/lr-ae/fragment-43" fragment, and another request identifies the "/service/lr-ae/fragment-40" fragment, etc.).

At step 903, the content server may identify the source(s) of the requests that were received at step 901. In some arrangements, the content server may identify the sources of the requests by analyzing each request and extracting the internet protocol address, or some other identifier, of a device that sent the request. For example, if two requests are received at step 901, and the first request is from receiving device 309-*b* of FIG. 3 and the second request is from receiving device 309-*c* of FIG. 4, the content server could analyze each request to determine the internet protocol addresses of receiving device 309-*b* and 309-*c*.

At step 905, the content server may determine a location or device in a network based on the sources that were identified at step 903. In some arrangements, the content server may gather, or otherwise determine, network topology information, or other data that provides information about network organization. The content server can then analyze and/or correlate the gathered information and the sources of the requests. For example, the content server could perform the analysis and/or correlation to determine a location and/or device in the network that is common along the network paths from the content server to the sources of the requests. In some instances, this location and/or device could be the point in the network that is closest to the content server and still common to the network paths from the content server and to all the sources of the requests. With reference to FIG. 3, termination system 307 of FIG. 3 may be malfunctioning or operating unexpectedly and causing packets to be lost. Receiving device 309-*a* of FIG. 3 may send a request for a content fragment to content server 301. Termination system 307 may service other receiving devices (not shown) in addition to receiving device 309-*a*, and some of these receiving devices may also transmit a request for a content fragment to content server 301. By analyzing and/or correlating the internet protocol addresses of receiving device 309-*a*, the addresses of the other receiving devices (not shown), and network topology information, the content server may identify termination system 307 as a potential location in the network that is causing packet loss. In some instances, the gathered information may include an identifier of the location and/or device, such as, for example, an address of the device (e.g., IP address), a geographical location of the device, or some other information identifying the determined location and/or device.

Referring again to FIG. 9, at step 907, the content server may notify a network device of the identified location/device, such as by transmitting information identifying the location and/or device to a computing device or database of the content provider (e.g., transmit a report that includes information identifying the location and/or device for storage in a database). The content provider can use this information in various ways, such as, for example, by informing a service technician that the location or device may be malfunctioning and/or directing a service technician to perform maintenance at the location or to the device.

Figure 10:
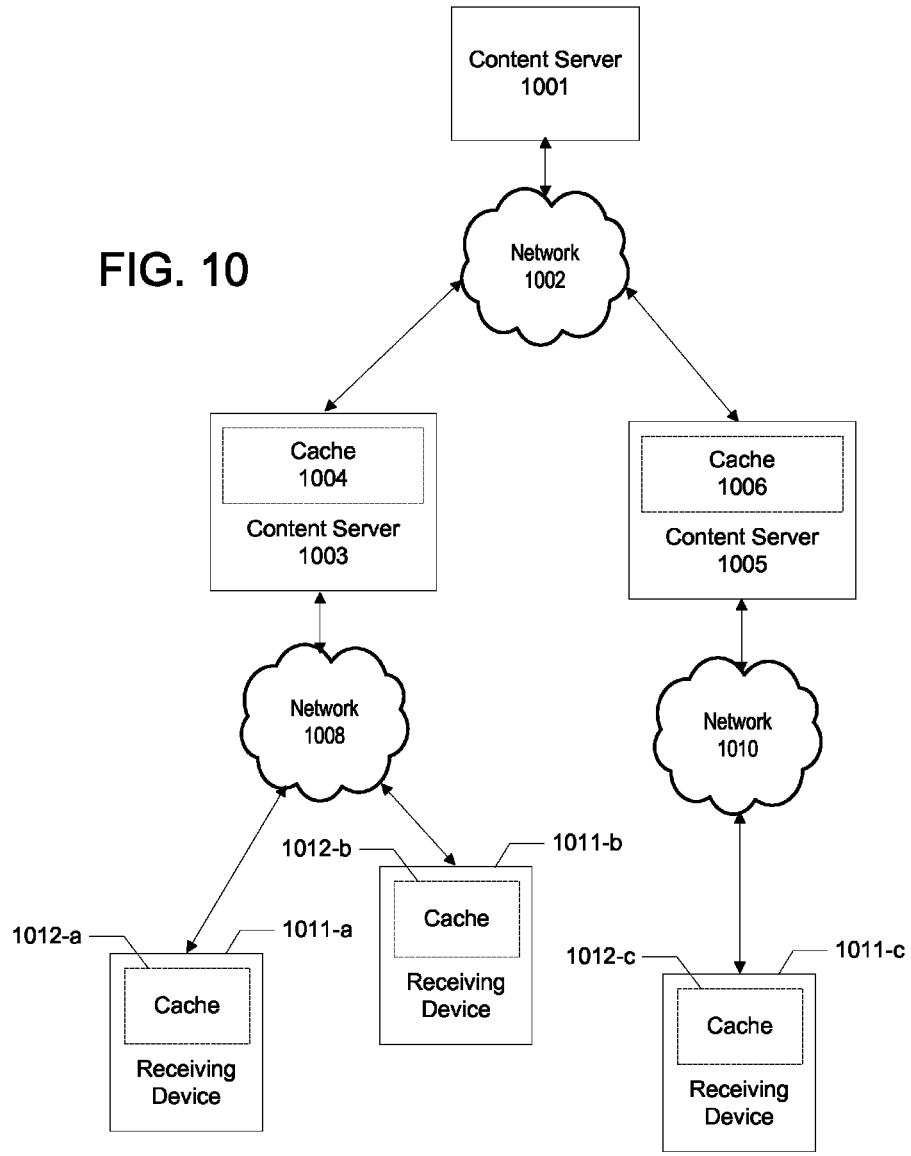
FIG. 10 illustrates an example system for transmitting content in a hierarchical network architecture according to one or more aspects of the disclosure.

Content servers that are configured to perform transmissions, such as multicast transmission, may be organized in various ways. For example, FIG. 3, which was discussed above, illustrates an example system where a content server may transmit data to receiving devices. As another example, FIG. 10 illustrates an example system for transmitting content in an hierarchical network architecture. As illustrated in FIG. 10, a system for transmitting content may include one or more content servers, such as content server 1001, content server 1003 and content server 1005. The system may also include one or more receiving devices, such as receiving device 1011-*a*, receiving device 1011-*b* and receiving device 1011-*c*.

A content server can be arranged in a system such that it transmits to receiving devices. For example, as illustrated in FIG. 10, content server 1003 can transmit data to receiving device 1011-*a* and/or receiving device 1011-*b* using at least network 1008. Receiving devices may be, for example, any user device such as a computer, smart phone, gateway, set top box, display device, etc. Content server 1005 can transmit data to receiving device 1011-*c* using at least network 1010. A content server can also be arranged in a system such that it transmits to another content server. For example, as illustrated in FIG. 10, content server 1001 can transmit data to content server 1003 and/or content server 1005 using at least network 1002.

Content servers can also include their own cache. As illustrated in FIG. 10, content server 1003 includes cache 1004 and content server 1005 includes cache 1006. In some arrangements, cache 1004 and cache 1006 can be used to store information, such as data received from content server 1001 and/or other data received from other sources. In some instances, content server 1001 may transmit a multicast transmission (e.g., transmit a pay-per-view event using packets conforming to DWOMP). Content server 1003 and content server 1005 may receive the multicast transmission, and store information based on the multicast in their respective caches. For example, content server 1003 may receive attribute and content packets of the multicast transmission, reassemble each content fragment and store the content fragments in cache 1004. Content server 1005 may receive the multicast transmission, and store the attribute and content packets of the multicast transmission in cache 1006.

Once received and/or stored, content server 1003 and 1005 may proceed to transmit the information to receiving devices. For example, content server 1003 may retrieve the stored content fragments, generate attribute and content packets for the content fragments, and transmit the attribute and content packets using a multicast transmission. This multicast transmission could be received and processed accordingly by receiving devices that are in communication with content server 1003 (e.g., receiving device 1011-*a*, receiving device 1011-*b*, as illustrated in FIG. 10). Additionally, content server 1003 could transmit the fragments using a unicast to a particular receiving device (e.g., receiving device 1011-*a*). Similarly, content server 1005 may retrieve the stored attribute and content fragments, optionally perform additional processing on the packets (e.g., update source information, etc.), and transmit the attribute and content packets in a multicast transmission, which could be received and processed accordingly by receiving devices that are in communication with content server 1005.

Additionally, because content server 1003 and 1005 may be receiving multicast transmissions from content server 1001, some or all may be configured to send requests for content fragments whenever they determine that a content fragment is missing from its cache (e.g., cache 1004 and 1006). Thus, content server 1003 and content server 1005 may be configured to perform a method similar to the example method illustrated by FIG. 7. However, in some embodiments, instead of receiving a request for content (e.g., step 701 of FIG. 7, where a request for content is received from a requesting device), a content server may be configured to perform the other steps of FIG. 7 (e.g., steps 703, 705, 707, 709 and/or 711) each time content fragments are transmitted via a multicast and/or via an unicast. For example, for each content fragment in a content item that is to be multicast, content server 1003 may be configured to determine whether a content fragment is stored in cache 1004 (e.g., step 703 of FIG. 7). If the content fragment is stored in cache 1004, content server 1003 may extract the fragment from the cache (e.g., step 709 of FIG. 7), generate the attribute packets and content packets for the content fragment, and transmit the content fragment (e.g., step 711 of FIG. 7) via a multicast transmission. If the content fragment is not stored in cache 1004, content server 1003 may send a request for the content fragment (e.g., step 705 of FIG. 7), and optionally wait for a period of time prior to rechecking the cache to determine whether the fragment has been inserted into cache 1004. The request for the content fragment may be received by content server 1001, and content server 1001 may be configured to respond to the request by performing a method similar to the example method illustrated in FIG. 8.

The hierarchical system of FIG. 10 could also be used to determine a location and/or device that caused a packet loss in the network. As discussed above, with respect to FIG. 9, a content server may be configured to receive requests for content fragments, identify sources of the received requests, determine a location (or device) in a network based on the sources, and notify a content provider of the location. Each content server of FIG. 10 could be configured to perform a method similar to the example method illustrated in FIG. 9. In some arrangements, this allows for each content server to identify different locations and/or devices. In other words, each content server could be responsible for locating the source of packet losses in different networks. For example, because content server 1001 receives requests from content servers 1003 and 1005, it may be able to identify locations and/or devices within network 1002. Content server 1003, on the other hand, may be able to identify locations and/or devices within network 1008, while content server 1005 may be identify locations and/or devices within network 1010.

Additionally, in some arrangements, the system may be arranged such that each network provides services to a different geographical region. For example, network 1008 may be providing service to receiving devices in a particular area of Washington, D.C. (e.g., receiving devices within the 20002 zip code). Network 1010 may be providing service to receiving devices in another area of Washington, D.C. (e.g., receiving devices within the 20005 zip code). Network 1002 may be providing services to a region including the two areas of Washington, D.C., and/or other service areas (e.g., a service area in Northern Virginia, such as Arlington). Such an arrangement could allow for a content provider to more easily identify where a network event is occurring, and/or to more quickly respond with maintenance to the malfunctioning location/device.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
    transmitting, by a computing device via one or more first transmissions, content fragments of a content item, each of the content fragments configured to be stored based on an identifier of each content fragment;
    receiving, from one of a plurality of receiving devices, a request to retransmit one content fragment of the content fragments;
    receiving, from one or more other receiving devices of the plurality of receiving devices, one or more additional requests to retransmit the one content fragment;
    determining, based on the request and the one or more additional requests, whether a threshold number of requests to retransmit has been received from the plurality of receiving devices;
    responsive to determining that the threshold number of requests to retransmit has been received from the plurality of receiving devices, transmitting, via one or more second transmissions, the one content fragment as (a) one or more content data packets and (b) one or more attribute packets that each comprises the identifier of the one content fragment and information enabling validation and storage, for later retrieval using the identifier of the one content fragment, of the one content fragment after reassembly of the one content fragment from the one or more content data packets;
    identifying which of the plurality of receiving devices sent the request and the one or more additional requests, resulting in information identifying sources of the request and the one or more additional requests;
    determining, based on the information identifying the sources, a location different from each location of the plurality of receiving devices or a device different from each of the plurality of receiving devices; and
    transmitting, to a network device, an identification of the location or the device.

2. The method of claim 1, wherein the information identifying the sources comprises Internet Protocol addresses identifying the sources, and wherein determining the location or the device comprises determining that the location or the device is causing packet loss based on an analysis of the Internet Protocol addresses.

3. The method of claim 1, wherein determining the location or the device comprises determining that the location or the device is causing packet loss based on an analysis of network topology information and the information identifying the sources.

4. The method of claim 1, wherein the request indicates that the one content fragment is missing from a cache of the one of the plurality of receiving devices and the request comprises the identifier of the one content fragment, and wherein transmitting the one content fragment causes the one of the plurality of receiving devices to insert the one content fragment into the cache.

5. The method of claim 1, wherein the content item comprises at least one of the following: a video file, video-on-demand content, a television program, pay-per-view content, interactive service content, electronic program guide data, object data, web data, software update content, or advertisement data.

6. The method of claim 1, further comprising:
    receiving the one or more first transmissions;
    reassembling the content fragments from data of the one or more first transmissions;
    storing the content fragments in a cache;
    determining that the one content fragment is missing from the cache;
    transmitting the request;
    receiving the one or more content data packets and the one or more attribute packets via the one or more second transmissions;
    reassembling the one content fragment based on the one or more content data packets and the one or more attribute packets;
    validating, after reassembling the one content fragment, the one content fragment;
    storing the one content fragment in the cache; and
    retrieving, at a time to transmit the one content fragment for consumption, the one content fragment based on the identifier of the one content fragment.

7. The method of claim 1, wherein the information identifying the sources comprises Internet protocol addresses.

8. A method, comprising:
    transmitting, by a computing device via one or more first transmissions, content fragments of a content item, each of the content fragments configured to be stored based on an identifier of each content fragment;
    receiving, from one of a plurality of receiving devices, a request to retransmit one content fragment of the content fragments;

receiving, from one or more other receiving devices of the plurality of receiving devices, one or more additional requests to retransmit the one content fragment;

determining, based on the request and the one or more additional requests, whether a threshold number of requests to retransmit has been received from the plurality of receiving devices;

responsive to determining that the threshold number of requests to retransmit has been received from the plurality of receiving devices, transmitting, via one or more second transmissions, the one content fragment as (a) one or more content data packets and (b) one or more attribute packets that each comprises the identifier of the one content fragment and information enabling validation and storage, for later retrieval using the identifier of the one content fragment, of the one content fragment after reassembly of the one content fragment from the one or more content data packets;

determining information indicating that the request and the one or more additional requests are from different sources;

determining, based on the information indicating that the request and the one or more additional requests are from different sources, a location different from each location of the plurality of receiving devices or a device different from each of the plurality of receiving devices; and transmitting, to a network device, an identification of the location or the device.

9. The method of claim 8, wherein the information indicating that the request and the one or more additional requests are from different sources comprises information indicating that the request and the one or more additional requests are from different Internet Protocol addresses, and wherein determining the location or the device comprises determining that the location or the device is causing packet loss based on an analysis of the information indicating that the request and the one or more additional requests are from different Internet Protocol addresses.

10. The method of claim 8, wherein determining the location or the device comprises determining that the location or the device is causing packet loss based on an analysis of network topology information and the information indicating that the request and the one or more additional requests are from different Internet Protocol addresses.

11. The method of claim 8, wherein the request indicates that the one content fragment is missing from a cache of the one of the plurality of receiving devices and the request comprises the identifier of the one content fragment, and wherein transmitting the one content fragment causes the one of the plurality of receiving devices to insert the one content fragment into the cache.

12. The method of claim 8, wherein the content item comprises at least one of the following: a video file, video-on-demand content, a television program, pay-per-view content, interactive service content, electronic program guide data, object data, web data, software update content, or advertisement data.

13. The method of claim 8, further comprising:
receiving the one or more first transmissions;
reassembling the content fragments from data of the one or more first transmissions;
storing the content fragments in a cache;
determining that the one content fragment is missing from the cache;
transmitting the request;
receiving the one or more content data packets and the one or more attribute packets via the one or more second transmissions;
reassembling the one content fragment based on the one or more content data packets and the one or more attribute packets;
validating, after reassembling the one content fragment, the one content fragment;
storing the one content fragment in the cache; and
retrieving, at a time to transmit the one content fragment for consumption, the one content fragment based on the identifier of the one content fragment.

14. The method of claim 8, the information indicating that the request and the one or more additional requests are from different sources comprises information indicating that the request and the one or more additional requests are from different Internet Protocol addresses, and wherein determining the location or the device comprises determining that the location or the device is causing packet loss based on an analysis of network topology information and the information indicating that the request and the one or more additional requests are from different Internet Protocol addresses.

15. A method, comprising:
transmitting, by a computing device via one or more first transmissions, content fragments of a content item, each of the content fragments configured to be stored based on an identifier of each content fragment;
receiving, from one of a plurality of receiving devices, a request to retransmit one content fragment of the content fragments;
receiving, from one or more other receiving devices of the plurality of receiving devices, one or more additional requests to retransmit the one content fragment;
determining, based on the request and the one or more additional requests, whether a threshold number of requests to retransmit has been received from the plurality of receiving devices;
responsive to determining that the threshold number of requests to retransmit has been received from the plurality of receiving devices, transmitting, via one or more second transmissions, the one content fragment as (a) one or more content data packets and (b) one or more attribute packets that each comprises the identifier of the one content fragment and information enabling validation and storage, for later retrieval using the identifier of the one content fragment, of the one content fragment after reassembly of the one content fragment from the one or more content data packets;
extracting a source Internet Protocol (IP) address from each of the request and the one or more additional requests, resulting in extracted source IP addresses;
determining, based on the extracted source IP addresses, a location different from each location of the plurality of receiving devices or a device different from each of the plurality of receiving devices; and
transmitting, to a network device, an identification of the location or the device.

16. The method of claim 15, wherein determining the location or the device comprises determining that the location or the device is causing packet loss based on an analysis of the extracted source IP addresses.

17. The method of claim 15, wherein determining the location or the device comprises determining that the location or the device is causing packet loss based on an analysis of network topology information and the extracted source IP addresses.

18. The method of claim 15, wherein the request indicates that the one content fragment is missing from a cache of the one of the plurality of receiving devices and the request comprises the identifier of the one content fragment, and wherein transmitting the one content fragment causes the one of the plurality of receiving devices to insert the one content fragment into the cache.

19. The method of claim 15, wherein the content item comprises at least one of the following: a video file, video-on-demand content, a television program, pay-per-view content, interactive service content, electronic program guide data, object data, web data, software update content, or advertisement data.

20. The method of claim 15, further comprising:
receiving the one or more first transmissions;
reassembling the content fragments from data of the one or more first transmissions;
storing the content fragments in a cache;
determining that the one content fragment is missing from the cache;
transmitting the request;
receiving the one or more content data packets and the one or more attribute packets via the one or more second transmissions;
reassembling the one content fragment based on the one or more content data packets and the one or more attribute packets;
validating, after reassembling the one content fragment, the one content fragment;
storing the one content fragment in the cache; and
retrieving, at a time to transmit the one content fragment for consumption, the one content fragment based on the identifier of the one content fragment.

* * * * *